(12) United States Patent
Stolbikov et al.

(10) Patent No.: US 11,374,898 B1
(45) Date of Patent: Jun. 28, 2022

(54) USE OF PARTIAL HASH OF DOMAIN NAME TO RETURN IP ADDRESS ASSOCIATED WITH THE DOMAIN NAME

(71) Applicant: Lenovo (Singapore) Pte. Ltd., Singapore (SG)

(72) Inventors: Igor Stolbikov, Apex, NC (US); Scott Wentao Li, Cary, NC (US); Joseph M. Pennisi, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/121,623

(22) Filed: Dec. 14, 2020

(51) Int. Cl.
| | | |
|---|---|---|
| *H04L 61/4511* | (2022.01) | |
| *H04L 9/08* | (2006.01) | |
| *H04L 9/14* | (2006.01) | |
| *H04L 9/32* | (2006.01) | |
| *G06N 7/00* | (2006.01) | |

(52) U.S. Cl.
CPC .......... *H04L 61/1511* (2013.01); *G06N 7/005* (2013.01); *H04L 9/0825* (2013.01); *H04L 9/14* (2013.01); *H04L 9/3247* (2013.01)

(58) Field of Classification Search
CPC ..... H04L 61/1511; H04L 9/0825; H04L 9/14; H04L 9/3247; G06N 7/005
See application file for complete search history.

(56) References Cited

U.S. PATENT DOCUMENTS

| | | | |
|---|---|---|---|
| 9,602,288 B1* | 3/2017 | Mikulski | H04L 9/3247 |
| 9,979,588 B1* | 5/2018 | Benson | H04L 61/106 |
| 2007/0226062 A1* | 9/2007 | Hughes | G06Q 30/0212 |
| | | | 463/9 |
| 2016/0226895 A1* | 8/2016 | Huang | G06F 21/552 |
| 2018/0004942 A1* | 1/2018 | Martin | G06F 21/554 |
| 2018/0109550 A1* | 4/2018 | Huang | H04L 63/1425 |

OTHER PUBLICATIONS

Fan et al., "Cuckoo Filter: Practically Better Than Bloom," Carnegie Mellon Parallel Data Laboratory, Next Conference. (Year: 2022).*
Tata, Nikhitha; "MicroCuckoo Hash Engine for High-Speed IP Lookup," Thesis submitted to the Faculty of the Virginia Polytechnic Institute and State University in partial fulfillment of the requirements for the degree of Master in Computer Engineering, May 5, 2017. (Year: 2017).*

(Continued)

*Primary Examiner* — Alina A Boutah
(74) *Attorney, Agent, or Firm* — John M. Rogitz; John L. Rogitz

(57) ABSTRACT

In one aspect, a first device may include at least one processor and storage accessible to the at least one processor. The storage may include instructions executable by the at least one processor to receive, from a second device, a partial hash of a domain name. The instructions may also be executable to use the partial hash and a probabilistic data structure to identify an Internet protocol (IP) address associated with the domain name. Responsive to identifying the IP address, the instructions may be executable to transmit the IP address to the second device.

20 Claims, 6 Drawing Sheets

(56) References Cited

OTHER PUBLICATIONS

Clayton et al., "Probabilistic Data Structures in Adversarial Environments," Florida Institute for Cybersecurity Research Computer and Information Science and Engineering University of Florida. (Year: 2019).*
"Bloom Filter", Wikipedia, retrieved from https://en.wikipedia.org/wiki/Bloom_filter.
"Category:Probabilistic data structures", Wikipedia, retrieved from https://en.wikipedia.org/wiki/Category: Probabilistic_data_structures.
"Cuckoo Filter", Wikipedia, retrieved from https://en.wikipedia.org/wiki/Cuckoo_filter.
"DNS over HTTPS", Wikipedia, retrieved from https://en.wikipedia.org/wiki/DNS_over_HTTPS.
"DNS over TLS", Wikipedia, retrieved from https://en.wikipedia.org/wiki/DNS_over_HTTPS.
"Domain Name System Security Extensions", Wikipedia, retrieved from https://en.wikipedia.org/wiki/Domain_Name_System_Security_Extensions#:~:text=The%20Domain%20Name%20System%20Security,Internet%20Protocol%20(IP)%20networks.
"Domain Name System", Wikipedia, retrieved from https://en.wikipedia.org/wiki/Domain_Name_System.
"Ephemeral Key", Wikipedia, retrieved from https://en.wikipedia.org/wiki/Ephemeral_key.
"Probabilistic Data Structure Showdown: Cuckoo Filters vs. Bloom Filters", Blog, Cloudera—Fast Forward, Nov. 23, 2016, retrieved from https://www.cloudera.com/products/fast-forward-labs-research.html.

* cited by examiner

USE OF PARTIAL HASH OF DOMAIN NAME TO RETURN IP ADDRESS ASSOCIATED WITH THE DOMAIN NAME

FIELD

The present application relates to technically inventive, non-routine solutions that are necessarily rooted in computer technology and that produce concrete technical improvements.

BACKGROUND

As recognized herein, domain name system (DNS) resolution can be very insecure. For instance, it can lead to man-in-the-middle (MITM) attacks by nefarious third parties that want to monitor browsing behavior. It can also lead to the compromising of sensitive electronic data and other computer privacy and computer security issues.

Consider that many DNS server caches can be poisoned. Poisoning can include replacing a valid Internet protocol (IP) address that is associated with a domain name in the DNS cache with another IP address to a third party website that may have malware or other malicious software code on it. When this happens, a requesting browser on the client device can be redirected to the malicious website rather than the requested website, compromising the security of the client device by infecting the device with viruses and other malware from the malicious website.

As also recognized herein, often times DNS servers freely share the server names and associated IP addresses they store with anyone, which can be a good source of data for nefarious third parties doing digital reconnaissance. Additionally, DNS relays can query information from internal workstations to outside servers, and as such can create covert channels through which sensitive data can be exfiltrated, browsing habits can be tracked without authorization, etc. Moreover, sometimes the DNS server is not even authenticated in the first place and so cannot be confirmed as a trusted source.

The present disclosure therefore recognizes that there are currently no adequate solutions to the foregoing computer-related, technological problems.

SUMMARY

Accordingly, in one aspect a first device includes at least one processor and storage accessible to the at least one processor. The storage includes instructions executable by the at least one processor to receive, from a second device, a partial hash of a domain name. The instructions are also executable to use the partial hash and a probabilistic data structure to identify an Internet protocol (IP) address associated with the domain name. Responsive to identifying the IP address, the instructions may be executable to transmit the IP address to the second device.

In various examples, the probabilistic data structure may include a Cuckoo filter and/or a Bloom filter.

Additionally, in some example implementations the partial hash as received at the first device may be encrypted using a first public key associated with the first device. The instructions may then be executable to decrypt the partial hash using a first private key associated with the first device to use the partial hash and the probabilistic data structure to identify the Internet protocol (IP) address associated with the domain name. Additionally, in some of these example implementations the instructions may be executable to receive or otherwise access a second public key associated with the second device, encrypt the IP address using the second public key, and transmit the encrypted IP address to the second device. The second public key may be different from the first public key. Also in some of these example implementations, the instructions may be executable to sign the encrypted IP address with the first private key to render a digital signature and transmit the digital signature to the second device with the encrypted IP address. The digital signature may indicate a date and/or time that the digital signature was generated.

Still further, in some example embodiments the instructions may be executable to, responsive to not being able to identify the IP address using the partial hash and the probabilistic data structure, transmit to the second device an indication of one or more domain name system (DNS) servers different from the first and second devices. The one or more DNS servers may be usable to identify the IP address.

Also in some example embodiments, the first device may include a server and the server may maintain the probabilistic data structure.

In another aspect, a method includes receiving, at a first device and from a second device, a partial hash of a domain name for a website. The method also includes using a probabilistic data structure to determine whether a match to the partial hash is identifiable and, responsive to determining that a match the partial hash is identifiable, transmitting to the second device an Internet protocol (IP) address associated with the domain name.

In various examples, the partial hash may not be a full hash of the domain name but may be selected from the full hash.

Also in various examples, the probabilistic data structure may include a Cuckoo filter and/or a Bloom filter.

Still further, if desired the method may include using the probabilistic data structure to determine whether a match to the partial hash is identifiable to within a threshold level of confidence.

In still another aspect, at least one computer readable storage medium (CRSM) that is not a transitory signal includes instructions executable by at least one processor to select part but not all of a hash of a domain name associated with a website. The instructions are also executable to transmit the selected part of the hash from a first device to a second device and to receive, at the first device and from the second device, an IP address associated with the domain name. The instructions are then executable to access the website using the IP address.

In some example implementations, the IP address may be a first IP address and the instructions may be executable to transmit the selected part of the hash from the first device to both the second device and a third device. The first, second, and third devices may be different from each other. In these implementations, the instructions may also be executable to receive, at the first device and from the second device, the first IP address. The instructions may then be executable to receive, at the first device and from the third device, a second IP address associated with the domain name. Thereafter, the instructions may be executable to compare the first IP address to the second IP address to determine whether the first and second IP addresses are the same. Responsive to determining that the first and second IP addresses are the same, the instructions may be executable to access the website using the IP address.

Also in some example implementations, the instructions may be executable to encrypt the selected part of the hash with a public key associated with the second device and to transmit the encrypted selected part from the first device to the second device. In some examples, the instructions may even be executable to transmit, to the second device, both the encrypted selected part and a public key associated with the first device. The instructions may then be executable to receive the IP address as encrypted with the public key associated with the first device, decrypt the IP address with a private key associated with the first device, and access the website using the decrypted IP address.

Also, in some example embodiments, the instructions may be executable to select the selected part by selecting a predetermined number of bits establishing some but not all of the hash, the predetermined number of bits being greater than one.

The details of present principles, both as to their structure and operation, can best be understood in reference to the accompanying drawings, in which like reference numerals refer to like parts, and in which:

DETAILED DESCRIPTION

Figure 1:
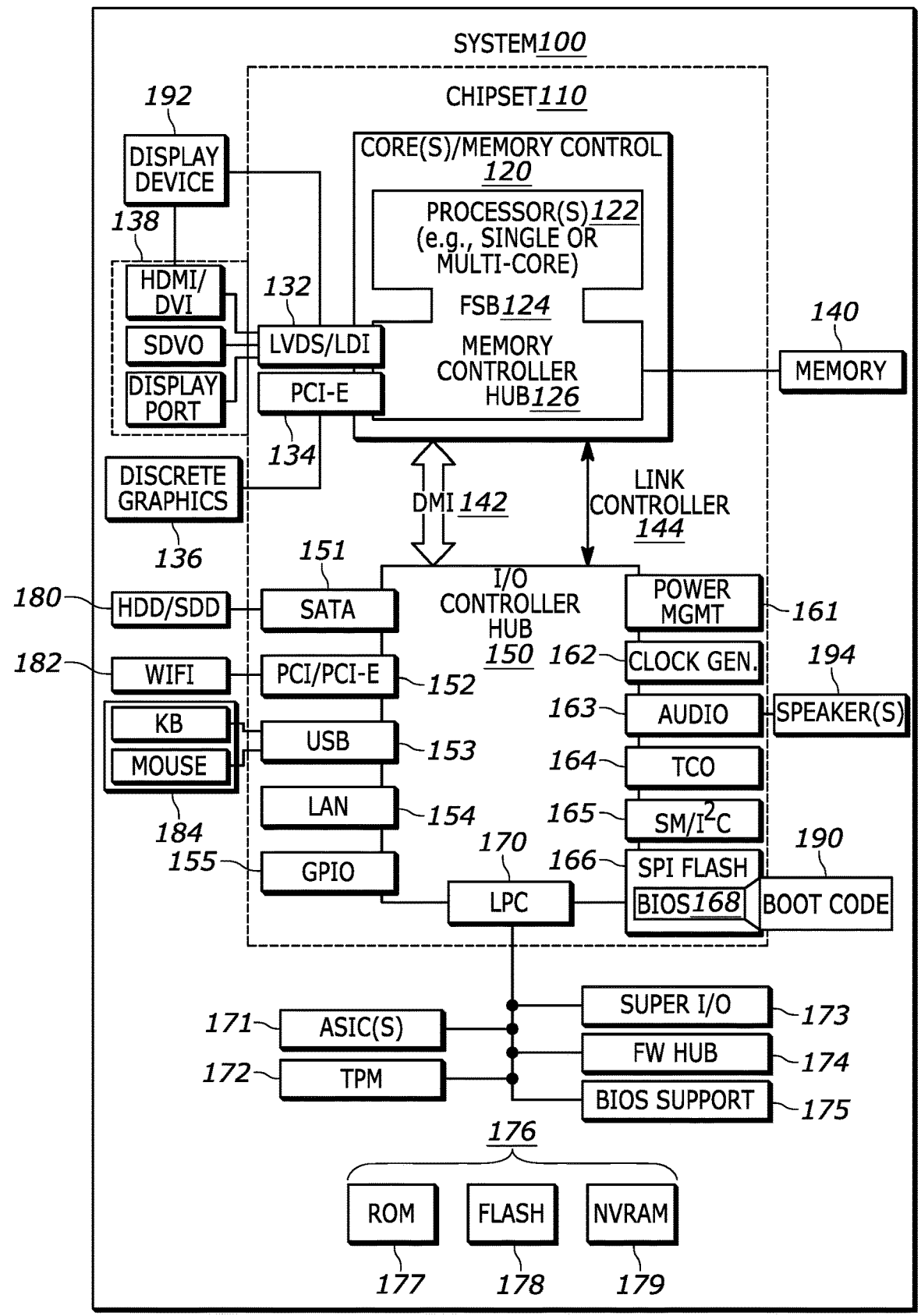
FIG. 1 is a block diagram of an example system consistent with present principles.

Among other things, the present disclosure describes domain name system (DNS) servers that maintain records in the form of cryptographic hashes of domain names and correlated Internet protocol (IP) addresses.

Accordingly, when a client device executes a browser request, the client device may send a partial hash of the website to which it would like to browse to the DNS server, possibly as encrypted with the DNS server's public key. The client device may then receive back an IP address that the DNS server has determined might relate to the partial hash even though the IP address cannot be definitively identified from the partial hash, thereby introducing uncertainty into the process to make browser tracking more difficult. The partial hash itself may be calculated at the client device as a substring of the full hash for the website's domain name.

An example of the type of encryption that may be used for the back and forth communication between the client device and server is Elliptic Curve Integrated Encryption Scheme (ECIES) encryption, where the partial hash may be encrypted with the DNS's public key using ECIES to increase privacy and confidentiality. Also, note that the client device's public key may be sent along with the encrypted partial hash itself so that the client device's public key can be used to encrypt return data also to increase privacy and confidentiality.

The length of the partial hash may be selected empirically (e.g., by a system administrator) to generate a subset that contains the requested domain with high probability, but while still introducing uncertainty so that the partial hash is not sufficient to concretely identify the domain name the client device might be looking for. For example, the substring could be only seven bits, which as desired might result in between twenty and one hundred DNS records matching the request.

The DNS server itself may maintain a probabilistic time-based hash structure of the hash records, thus allowing efficient probabilistic identification of the IP address from DNS records of full hashes using the partial hash and the subset. Examples of the probabilistic time-based hash structures that may be used include Bloom filters and Cuckoo filters. The Bloom or Cuckoo filters may be calculated out of cryptographic hash values for each respective domain name it has registered.

A resulting record correlated to whatever partial hash is received from the client device may then be signed by the DNS server using the server's private key so that the client device can verify the signature along with the date of the signature using the server's public key. If a record is not found for the partial hash, a returning message from the server to the client device may include a list of other authoritative DNS servers that may be used instead.

Accordingly, note that in some examples consistent with present principles, the Bloom or Cuckoo filters can be used to enforce information technology (IT) policies, have the client device avoid malicious sites, and/or enforce parental control policies without definitively revealing actual domain names.

Still further, note that in some examples gossip types of communications may be used where DNS servers may be selected by the client device randomly out of a list of, e.g., over one hundred DNS intermediate servers, with potentially two or more intermediate servers being selected for the DNS name resolution call. Returned results from each DNS intermediate server may then be compared to ensure valid DNS retrieval and to identify any potential malicious acts at one server to attempt to inject spoofed DNS results.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides the images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
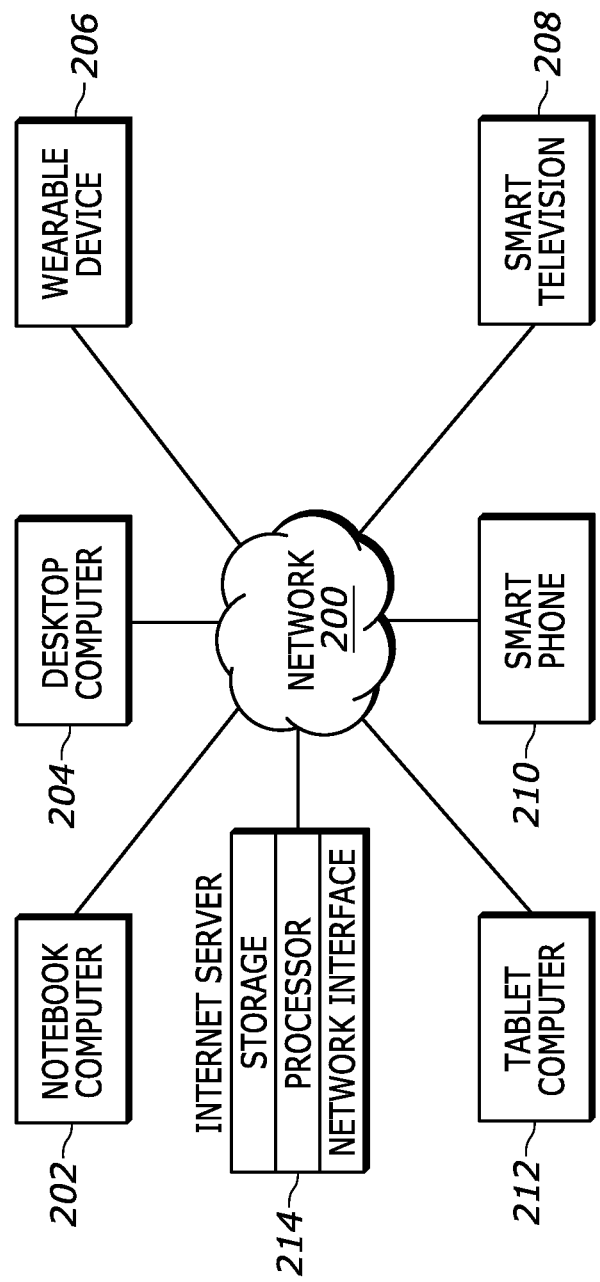
FIG. 2 is a block diagram of an example network of devices consistent with present principles.

Turning now to FIG. 2, example devices are shown communicating over a network 200 such as the Internet consistent with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
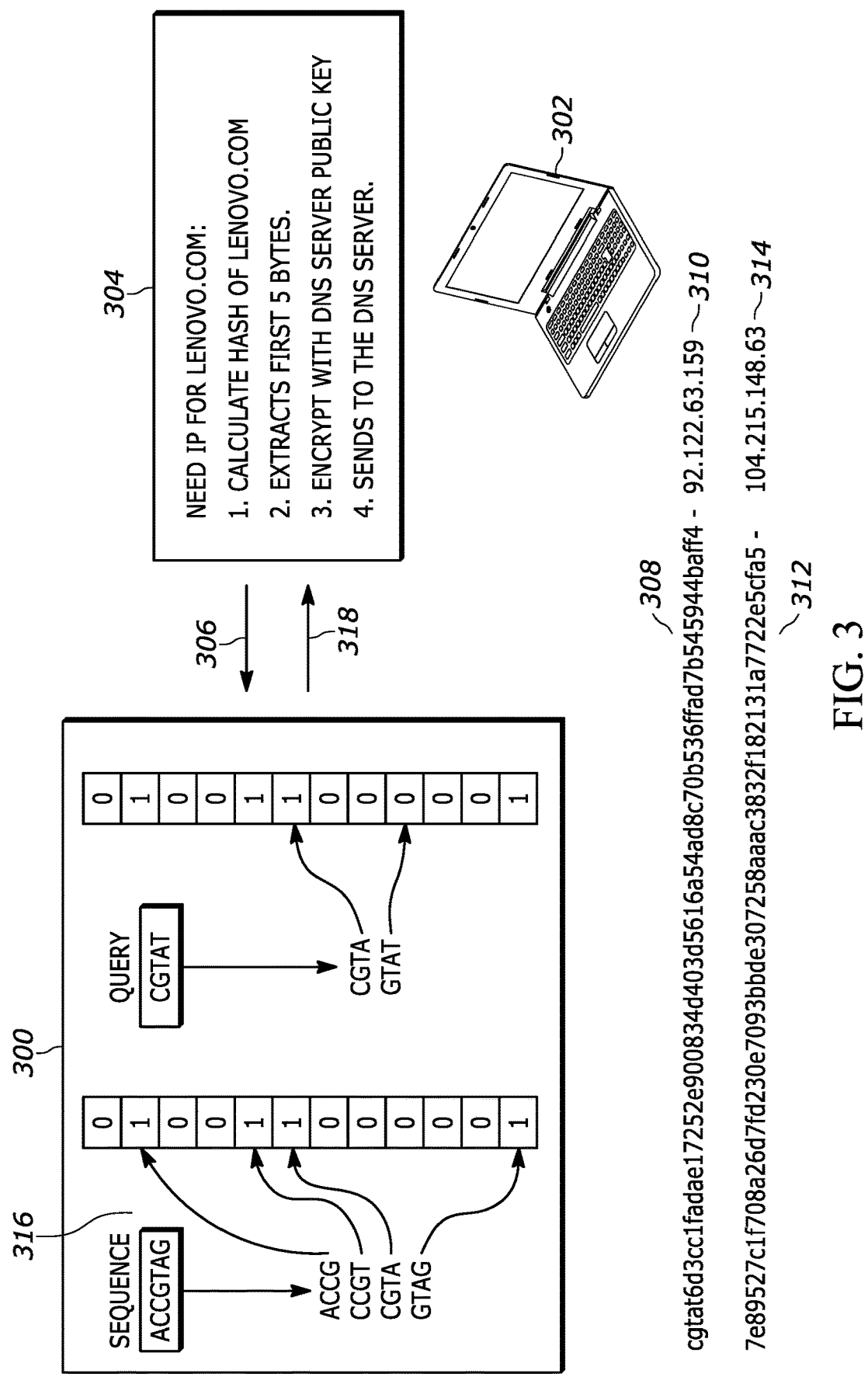
FIG. 3 is an example schematic diagram of a DNS server and client device communicating consistent with present principles.

Now describing FIG. 3, it shows a schematic diagram illustrating present principles. As shown, a domain name system (DNS) server 300 may communicate over the Internet or another network with a client device such as a laptop computer 302. However, note that in other examples the client device may be established by a smartphone, tablet computer, or other computing device.

Assume as an example per FIG. 3 that the computer 302 has received a command from an end-user to navigate using an Internet browser application to a website with a uniform resource locator (URL) having the domain name lenovo-.com. In order for the computer 302 to receive an Internet protocol (IP) address for that website to actually navigate to the website using the IP address, as indicated in demonstrative box 304 the computer 302 may use an agreed-upon hash algorithm to hash the domain name lenovo.com (e.g., responsive to receiving the command from the end-user to navigate to the website). Example hash algorithms that may be used include MD5 (Message-Digest algorithm 5) and SHA-1 (Secure Hash Algorithm), although others may be used as well. Some example hashes that are generated may consist of two hundred fifty six bits, though hashes of other lengths may also be used.

Thus, an example entire first hash 308 of the domain name lenovo.com is shown in FIG. 3 along with an example IP address 310 for that same domain name as returned by the DNS server 300. Also for illustration, the reader of the present disclosure can compare the first hash 308 to a second hash 312 produced using the same hash algorithm but for a different domain name (e.g., microsoft.com). FIG. 3 also shows an example IP address 314 that would be returned from the server 300 for that different domain name. Note that the hashes 308, 312 as shown are examples but demonstrate how widely different the hashes for different domain names may be, even when using the same hash algorithm to generate them.

As also indicated in the steps shown in box 304, after generating the hash 308 the computer 302 may select a predetermined number of bits from the first hash 308 to render a partial hash. The partial hash may therefore be a substring of the first hash and form part but not all of the entire first hash. Note that this partial hash might sometimes be referred to below as a "third hash". Also note that the predetermined number of bits for getting the partial hash may be agreed-upon in advance in that the computer 302 and server 300 may have already agreed on a particular number of bits to select. However, in other examples one of the two devices may simply specify to the other one the predetermined number of bits to be used.

Still describing selection of the partial hash, further note that the place within the first hash from which the partial hash may be extracted may be random in some examples. But even if random, the extracted bits of the partial hash may still be in the same bit sequence as they were in as appearing in the first, full hash.

However, further note that while the beginning bit location of the sequence for the partial hash may be random in some examples, in other examples the predetermined number of bits may also be selected specifically from a predetermined place within the first hash. For example, the third hash may be established as the first five bits of the full, first hash. Or the third hash may be established as the seven bits in the first, full hash following the first three bits of the first, full hash. Or the third hash may be established as the last eight bits of the first, full hash. This too may be agreed-upon by the computer 302 and server 300, or simply specified by one of them.

In any case, once the third (partial) hash has been selected from the first hash, as also shown in box 304 the computer 302 may then encrypt the third hash with the public key for the DNS server 300 as published by the DNS server 300 (or another entity). As demonstrated by arrow 306, the encrypted third hash may then be sent to the server 300 along with a different public key, with this different public key being the public encryption key for the computer 302 itself so that the server can eventually use the computer 302's public key to encrypt the IP address it sends in return.

Accordingly, it is to be understood that in at least some examples, an integrated encryption scheme may be used (such as an elliptic curve integrated encryption scheme (ECIES)) to help with authenticity, integrity, and confidentiality. Also, in at least some examples, ephemeral private/public key use in particular may be used, though static keys may also be used in other examples. But assuming ephemeral private/public keys are used consistent with present principles, in some examples each public/private key pair—one pair for the server 300 and one pair for the computer 302—may be used only once for the communication back and forth to provide the computer 302 with an IP address for the requested website and then each pair's use may be discontinued.

In any case, once the server 300 receives the encrypted third hash from the computer 302, it may decrypt the third hash using the server's private key (that is reciprocal to its public key as used by the computer 302 to encrypt the third hash). A probabilistic data structure for hash records as stored and/or maintained at the server 300 may then be queried using the third hash (e.g., query all the hash records or a subset as described above) to determine whether the third hash is a member of the relevant set of values. An example representation 316 of a Bloom filter or a Cuckoo filter being sequenced and queried is shown in FIG. 3, and thus it is to be understood that either of a Bloom filter or Cuckoo filter may establish the probabilistic data structure. However, other suitable probabilistic data structures may also be used.

Then, assuming the third hash is matched to a member of the set using the filter, an IP address also stored at the server 300 and associated with the matched member may be identified. The IP address may then be encrypted using the public key of the computer 302 as previously received from the computer 302. The encrypted IP address may then be sent to the computer 302, as indicated by arrow 318.

In some examples, the server 300 may also sign the encrypted IP address via a digital signature and transmit the digital signature to the computer 302 as well (also demonstrated by the arrow 318). For added security, the digital signature may indicate a date and/or time that the digital signature was generated so the computer 302 can validate that the encrypted IP address was provided by the server 300 in response to and after the computer 302 itself submitted the third hash to the server 300, further demonstrating that the encrypted IP address received at the computer 302 can be trusted.

Once the computer 302 validates the digital signature it receives, it may decrypt the received IP address itself using the private key for the computer 302. Or if no digital signature was used, the computer 302 may simply decrypt the IP address using the private key for the computer 302. The IP address may then be used by the browser application executing at the computer 302 to navigate to the requested web site.

Figure 4:
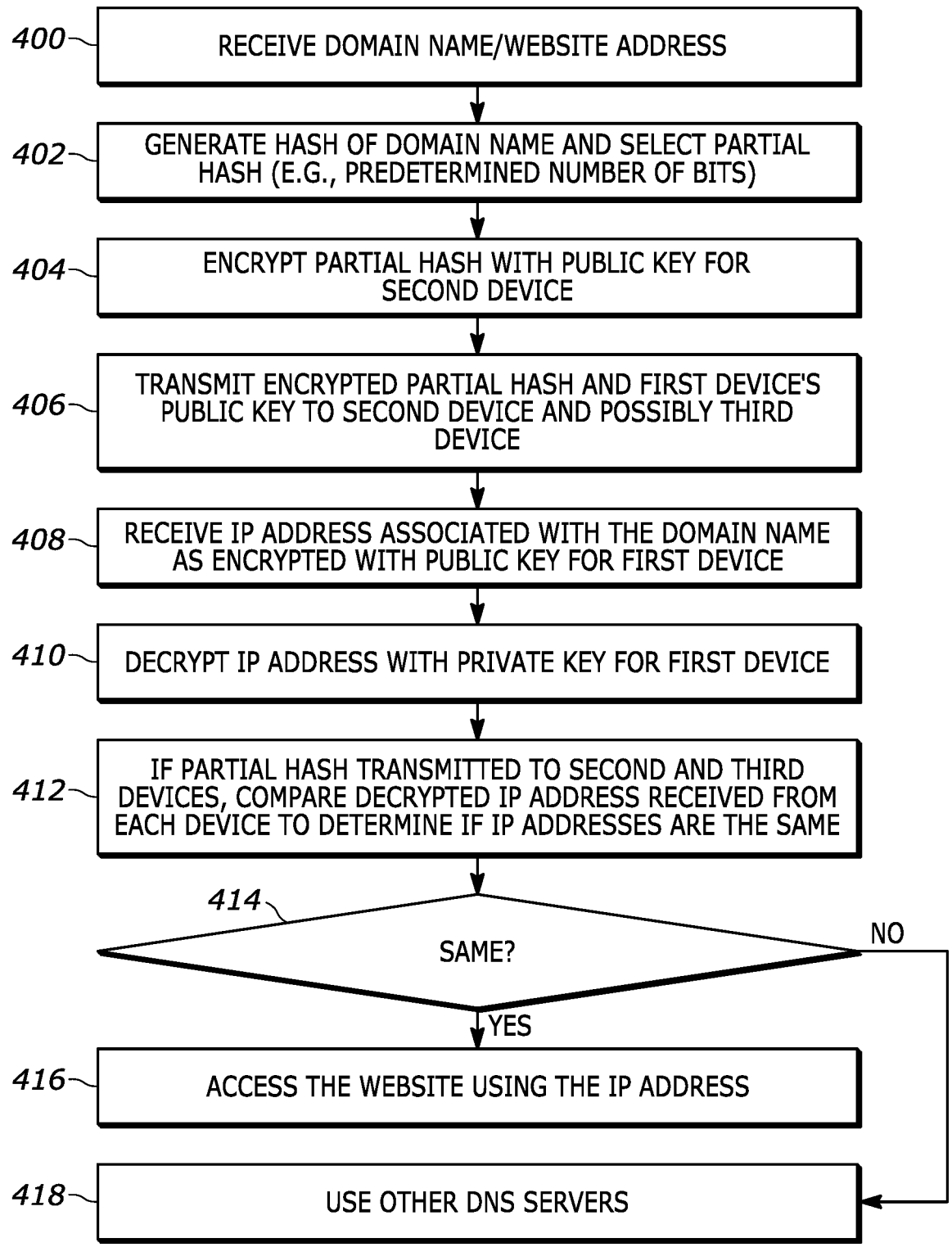
FIG. 4 is a flow chart of an example algorithm that may be executed by a client device consistent with present principles.

Now referring to FIG. 4, it shows example logic that may be executed by the computer 302 or another client device consistent with present principles. Beginning at block 400, the client device may receive a command from an end-user to navigate to a particular website address having a particular domain name as may be specified by the end-user. From block 400 the logic may then move to block 402. At block 402 the client device may generate a full hash of the domain name and then select part of the full hash as set forth above (e.g., a predetermined number of bits).

From block 402 the logic may then proceed to block 404. At block 404 the partial hash may be encrypted with the public key of a second device (such as the server 300 described above). The logic may then move to block 406 where the client device may transmit the encrypted partial hash and the client device's public key to the second device.

In some examples and also at block 406, the client device may also transmit the encrypted partial hash and the client device's public key to a third device, such as another DNS server different from the second device. The purpose of doing so will become apparent shortly.

From block 406 the logic may then move to block 408. At block 408 the client device may receive back from the second device an IP address determined by the second device to be associated with the domain name of the website requested by the end-user based on the partial hash that was provided. Again note that the received IP address may have been encrypted with the client device's public key.

Also note that if the encrypted partial hash and the client device's public key were also transmitted to a third device at block 406, at block 408 the client device may receive back from the third device an IP address determined by the third device to be associated with the domain name of the website requested by the end-user. The IP address received from the third device may have also been encrypted with the client device's public key.

From block 408 the logic may then proceed to block 410. At block 410 the received IP address(es) may be decrypted at the client device using the client device's private key. If the client device only transmits an IP address request to a single DNS server (the second device in this example) and receives back the IP address, the logic may then proceed directly to block 416 as will be described shortly.

Also, note that if the client only transmits an IP address request to a single DNS server and does not receive back an IP address (e.g., owing to the DNS server not being able to determine one using a Bloom or Cuckoo filter), the client device might still receive a response from the DNS server that includes a list of other, authoritative DNS servers that may be contacted. In this situation the logic may proceed directly to block 418 to contact other DNS servers from the list.

However, still in reference to block 410, consider the example above where the client device transmits requests to both the second device and a third device and receives back an IP address from each of the second and third devices (that was respectively determined by that device to be associated with the domain name of the website requested by the end-user). In this example, the logic may proceed to block 412.

At block 412 a "gossip" tactic may be employed where the decrypted IP address received from the second device may be compared to the decrypted IP address received from the third device to determine at decision diamond 414 whether the received IP addresses indicate the same IP address. Given uncertainty was being introduced by the client device in transmitting a partial hash of the domain name in the first place (for security and privacy), the received IP addresses may be determined to be the same so that one IP address received from one DNS server is confirmed by the IP address received from the other DNS server. This may help establish an added layer of confirmation and security in case the DNS records of one of the servers was poisoned, other malicious acts occurred to attempt to inject a spoofed DNS result, and/or a man-in-the-middle attack occurred between the client device and one of the other devices.

Continuing the description of FIG. 4, either directly from block 410 or responsive to an affirmative determination at diamond 414, the logic may proceed to block 416. At block 416 the client device may access the website using the IP address received from the second device (and possibly confirmed by the third device).

However, also note that in implementations where IP addresses from second and third devices are received as set forth above, and responsive to a negative determination at diamond 414, the logic may instead proceed to block 418.

At block 418 the client device may decline to use either IP address received from the second or third devices since the received IP addresses do not match. Also at block 418, either based on the IP addresses not matching or if a single DNS server provided a list of other authoritative DNS servers to use (e.g., since it could not determine an IP address itself), the client device may contact one or more of the other DNS servers and begin the process of FIG. 4 again for those DNS servers.

Thus, for example, if IP addresses received from the second and third devices did not match, fourth and fifth devices that are different and are also DNS servers may be contacted at block 418 to attempt to match IP addresses from those DNS servers using the gossip tactic again.

As another example, where the client device only transmits the encrypted partial hash to a single DNS server but an IP address was not received in response, at block 418 the client device may transmit the encrypted partial hash to another DNS server indicated in the list of authoritative servers described above in order to hopefully receive an IP address back from that server to navigate to the requested website. The process set forth in FIG. 4 may thus be repeated according to this example until such time as an IP address is received or a timeout occurs.

Figure 5:
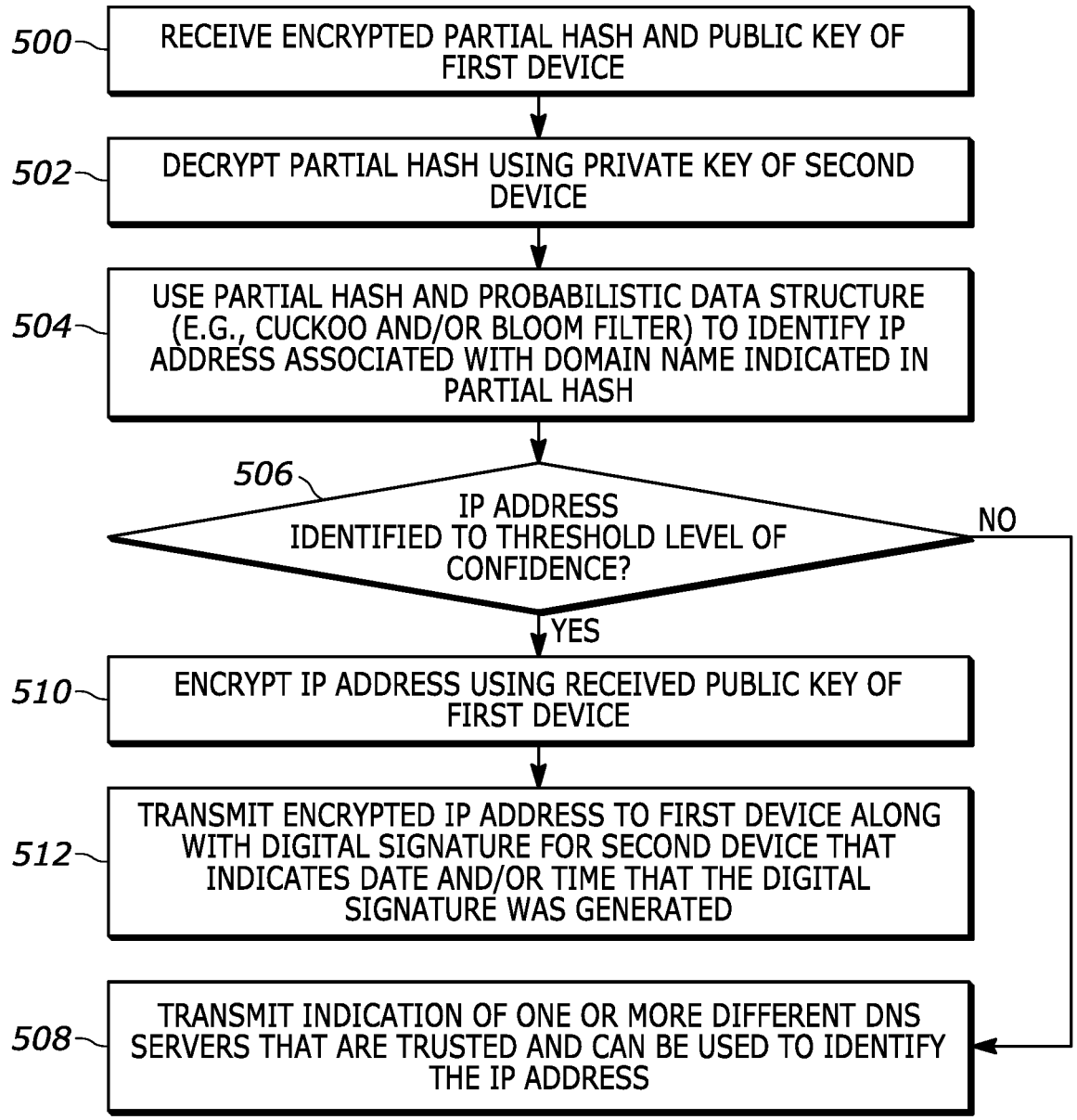
FIG. 5 is a flow chart of an example algorithm that may be executed by a DNS server or other device consistent with present principles.

Continuing the detailed description in reference to FIG. 5, it shows example logic that may be executed by the server 300, another DNS server, or any other device that communicates with the client devices described above. Thus, for simplicity the device executing the logic of FIG. 5 will be referred to below as a server even though it may be executed by devices other than servers in some examples.

Beginning at block 500, the server may receive an encrypted partial hash of a domain name from a client device (a "first device" in reference to FIG. 5). Again note that the partial hash may have been encrypted using the public key for the server itself. Further note that at block 500 the server may also receive the public key for the first device.

From block 500 the logic may then proceed to block 502. At block 502 the server may decrypt the partial hash using the server's private key and then, at block 504, use the partial hash and a probabilistic data structure like a Bloom or Cuckoo filter to identify an IP address that is associated with the domain name indicated by the partial hash. From block 504 the logic may then proceed to decision diamond 506.

At diamond 506 the server may determine whether an identified IP address has been identified to at least within a threshold level of confidence. The threshold level may be set by a system administrator or other user, for example. Responsive to a negative determination at diamond 506 (e.g., that either no IP address was identified using the probabilistic data structure or that an identified IP address was not identified to the threshold level of confidence), the logic may proceed to block 508. At block 508 the logic may transmit a message to the first device containing a list of one or more other DNS servers that can be trusted to request and return a valid IP address for the requested web site.

However, if an affirmative determination is made at diamond 506 rather than a negative one, the logic may instead move to block 510. At block 510 the server may encrypt the IP address it has identified to at least within the threshold level of confidence. Again note that the IP address may be encrypted at this step using the public key of the first device that was received at block 500.

From block 510 the logic may then proceed to block 512. At block 512 the server may transmit the encrypted IP address to the first device along with a digital signature validating that the IP address came from the server. Thus, the digital signature may be generated using the server's private key for decryption by the first device using the server's public key. Again note that the digital signature may indicate the date and/or time of day that the digital signature was generated.

Figure 6:
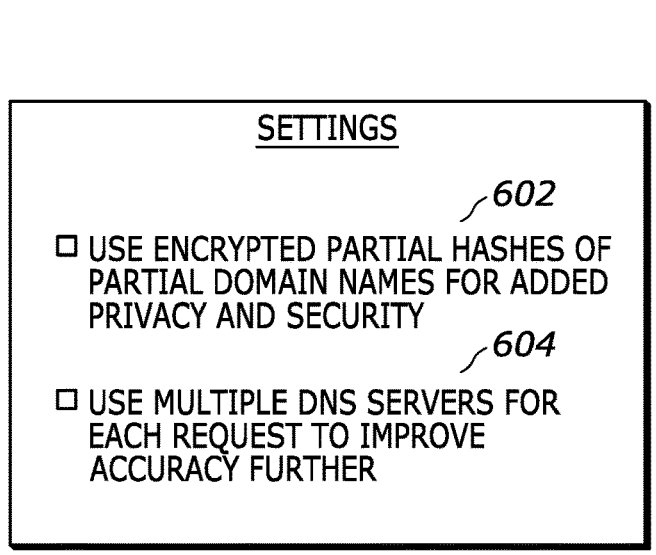
FIG. 6 is an example graphical user interface (GUI) that may be presented on the display of a client device for configuring one or more settings of the client device to operate consistent with present principles.

Now in reference to FIG. 6, it shows an example graphical user interface (GUI) 600 that may be presented on the display of a client device consistent with present principles. Responsive to user command, the GUI 600 may thus be presented on the display of the client device to configure one or more settings of the client device to operate as described herein. Note that in this example each of the options discussed below may be selected by directing touch or cursor input to the adjacent check box.

As shown in FIG. 6, the GUI 600 may include a first option 602 that may be selectable to set or enable the first device to in the future access websites by using encrypted partial hashes as set forth herein. For instance, the option 602 may be selected to set or configure the first device to execute functions described above in reference to the computer 302 and/or to execute the logic of FIG. 4.

As also shown in FIG. 6, the GUI 600 may include an option 604 that may be selectable to set or configure the first device to not just submit an encrypted partial hash of a website domain name to a single DNS server but to specifically employ the gossip tactic described above where the encrypted partial hash may be submitted to multiple DNS servers and then IP addresses received from each one may be compared to determine if they are the same.

Figure 7:
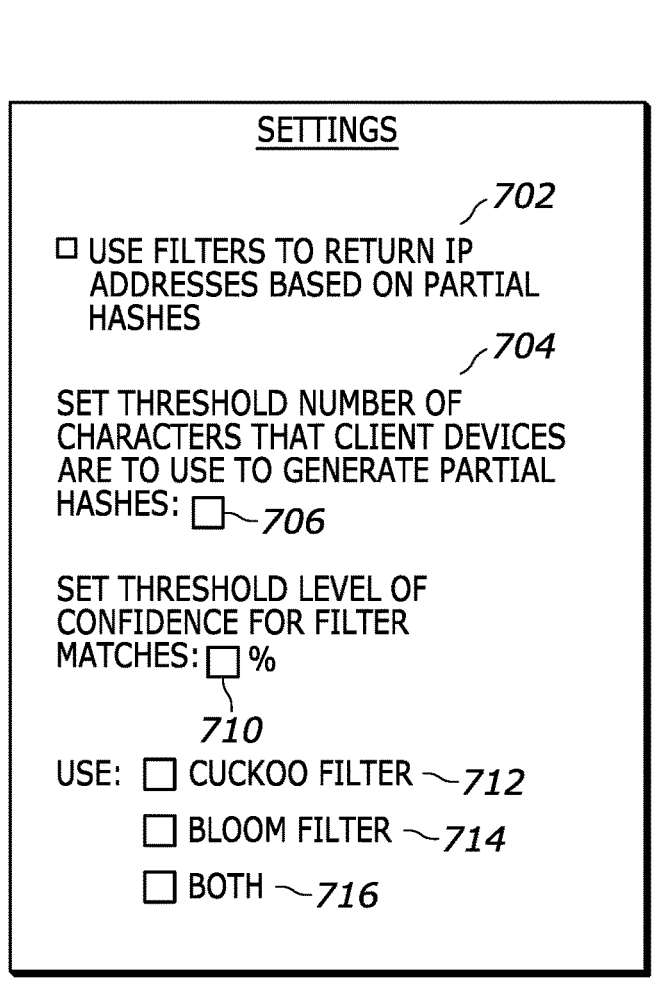
FIG. 7 is an example GUI that may be presented on the display of a DNS server for configuring one or more settings of the DNS server to operate consistent with present principles.

Now describing FIG. 7, it shows an example GUI 700 that may be presented on the display of a DNS server as described above. Responsive to system administrator command, the GUI 700 may thus be presented on a display controlled by the server to configure one or more settings of the server to operate consistent with present principles.

Accordingly, as shown in FIG. 7, the GUI 700 may include a first option 702 to set or enable the server to in the future receive encrypted partial hashes and use a probabilistic data structure to identify associated IP addresses as described herein. For instance, the option 702 may be selected by a system administrator or technician managing the server to set or configure the server to execute functions described above in reference to the server 300 and/or to execute the logic of FIG. 5.

As also shown in FIG. 7, the GUI 700 may include a setting 704 at which a threshold number of bits may be entered that a client device is to use for the hash it submits to the server. Input box 706 may thus be used to enter the threshold number, and that number may then be published publicly either at the server or another device for inquiring client devices to find out so they may comport their partial hashes to the threshold number.

The GUI 700 may also include a setting 708 at which a threshold level of confidence may be set that is to be used, e.g., at diamond 506 as described above. Thus, user input may be directed to input box 710 to establish the threshold level as a percentage.

FIG. 7 further shows that the GUI 700 may include respective options 712, 714 to select use of either a Cuckoo filter (option 712) or Bloom filter (option 714) as the probabilistic data structure to use consistent with present principles. Additionally, in some examples an option 716 may be presented to select use of both a Cuckoo filter and a Bloom filter to identify an IP address based on a received partial hash with possibly even greater accuracy (e.g., if the outputs from each filter match).

It may now be appreciated that present principles provide for improved DNS resolution and increase the functionality, security, and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one processor; and
storage accessible to the at least one processor and comprising instructions executable by the at least one processor to:
receive, from a second device, a partial hash of a domain name;
use the partial hash and a probabilistic data structure to identify an Internet protocol (IP) address associated with the domain name; and
responsive to identifying the IP address, transmit the IP address to the second device.

2. The first device of claim 1, wherein the probabilistic data structure comprises a Cuckoo filter.

3. The first device of claim 1, wherein the probabilistic data structure comprises a Bloom filter.

4. The first device of claim 1, wherein the partial hash as received at the first device is encrypted using a first public key associated with the first device, and wherein the instructions are executable to:
decrypt the partial hash using a first private key associated with the first device to use the partial hash and the probabilistic data structure to identify the Internet protocol (IP) address associated with the domain name.

5. The first device of claim 4, wherein the instructions are executable to:
receive or otherwise access a second public key associated with the second device, the second public key being different from the first public key;
encrypt the IP address using the second public key; and
transmit the encrypted IP address to the second device.

6. The first device of claim 5, wherein the instructions are executable to:
sign the encrypted IP address with the first private key to render a digital signature; and
transmit the digital signature to the second device with the encrypted IP address.

7. The first device of claim 6, wherein the digital signature indicates a date and/or time that the digital signature was generated.

8. The first device of claim 1, wherein the instructions are executable to:
responsive to not being able to identify the IP address using the partial hash and the probabilistic data structure, transmit to the second device an indication of one or more domain name system (DNS) servers different from the first and second devices, the one or more DNS servers being usable to identify the IP address.

9. The first device of claim 1, wherein the first device comprises a server, and wherein the server maintains the probabilistic data structure.

10. A method, comprising:
receiving, at a first device and from a second device, a partial hash of a domain name for a website;
using a probabilistic data structure to determine whether a match to the partial hash is identifiable; and
responsive to determining that a match the partial hash is identifiable, transmitting to the second device an Internet protocol (IP) address associated with the domain name.

11. The method of claim 10, wherein the partial hash is not a full hash of the domain name, the partial hash being selected from the full hash.

12. The method of claim 10, wherein the probabilistic data structure comprises a Cuckoo filter.

13. The method of claim 10, wherein the probabilistic data structure comprises a Bloom filter.

14. The method of claim 10, wherein the method comprises:
using the probabilistic data structure to determine whether a match to the partial hash is identifiable to within a threshold level of confidence.

15. At least one computer readable storage medium (CRSM) that is not a transitory signal, the computer readable storage medium comprising instructions executable by at least one processor to:

receive, from a device, a partial hash of a domain name;
use the partial hash and a probabilistic data structure to identify an Internet protocol (IP) address associated with the domain name; and
responsive to identifying the IP address, transmit the IP address to the device.

16. The CRSM of claim 15, wherein the probabilistic data structure comprises a Cuckoo filter.

17. The CRSM of claim 15, wherein the probabilistic data structure comprises a Bloom filter.

18. The CRSM of claim 15, wherein the instructions are executable to:
responsive to not being able to identify the IP address using the partial hash and the probabilistic data structure, transmit to the device an indication of one or more domain name system (DNS) servers, the one or more DNS servers being usable to identify the IP address.

19. The CRSM of claim 15, wherein the partial hash is not a full hash of the domain name, the partial hash being selected from the full hash.

20. The CRSM of claim 15, wherein the instructions are executable to:
use the probabilistic data structure to determine whether a match to the partial hash is identifiable to within a threshold level of confidence.

* * * * *